US012776896B2

(12) United States Patent
Qiu et al.

(10) Patent No.: US 12,776,896 B2
(45) Date of Patent: Oct. 27, 2026

(54) METHOD AND APPARATUS FOR GENERATING AND USING IMPLICITLY ATTESTED CERTIFICATE SIGNING REQUESTS

(71) Applicant: ARRIS Enterprises LLC, Horsham, PA (US)

(72) Inventors: Xin Qiu, San Diego, CA (US); Yiqun Yin, Riverside, CT (US); Oscar Jiang, West Covina, CA (US); Jason A. Pasion, San Diego, CA (US)

(73) Assignee: ARRIS Enterprises LLC, Horsham, PA (US)

( * ) Notice: Subject to any disclaimer, the term of this patent is extended or adjusted under 35 U.S.C. 154(b) by 48 days.

(21) Appl. No.: 18/946,167

(22) Filed: Nov. 13, 2024

(65) Prior Publication Data

US 2025/0175325 A1 May 29, 2025

Related U.S. Application Data

(60) Provisional application No. 63/603,395, filed on Nov. 28, 2023.

(51) Int. Cl.
*H04L 9/08* (2006.01)
*H04L 9/30* (2006.01)

(52) U.S. Cl.
CPC .......... *H04L 9/0825* (2013.01); *H04L 9/3073* (2013.01)

(58) Field of Classification Search
CPC ..... H04L 9/0825; H04L 9/3073; H04L 9/006; H04L 9/3247; H04L 9/3263; H04L 9/3268; H04L 63/0428; H04L 63/0823
See application file for complete search history.

(56) References Cited

U.S. PATENT DOCUMENTS

| | | | | |
|---|---|---|---|---|
| 2014/0074719 | A1* | 3/2014 | Gressel | G06Q 30/06 713/168 |
| 2015/0319142 | A1* | 11/2015 | Herberg | H04L 9/3228 713/171 |
| 2021/0044558 | A1* | 2/2021 | Eisen | H04L 51/23 |
| 2021/0132975 | A1* | 5/2021 | Chandrashekar | G06F 9/5077 |
| 2022/0182244 | A1* | 6/2022 | Falk | H04L 63/0823 |
| 2022/0292203 | A1* | 9/2022 | Severns-Williams | G06F 21/57 |
| 2023/0409756 | A1* | 12/2023 | Baldwin | H04L 9/0877 |

OTHER PUBLICATIONS

International Search Report and Written Opinion RE: Application No. PCT/US2024/057854, dated Mar. 10, 2025.

(Continued)

*Primary Examiner* — Blake I Narramore
(74) *Attorney, Agent, or Firm* — Chernoff, Vilhauer, McClung & Stenzel, LLP

(57) ABSTRACT

A method and apparatus for generating and processing implicitly attested Certificate Signing Requests (CSRs) is disclosed. In one embodiment, the method comprises generating a message having a public key of a key pair of a device and an identifier of a device; generating a digest of the message; signing the digest according to a private key of the key pair of the device; and encoding the signed digest and the public key to produce the CSR; wherein the CSR implicitly attests to the identity of the device according to at least one of the message, the digest, and the encoding.

21 Claims, 3 Drawing Sheets

(56) References Cited

OTHER PUBLICATIONS

Pritikin M et al: Enrollment over Secure Transport; RFC7030./TXT, Internet Engineering Task Force, IETF; Standard, Internet Society (ISOC) 4, Rue Des Falaises CH-1205 Geneva, Switzerland, Oct. 23, 2013, pp. 1-53, XP 015094936, [retrieved on Oct. 23, 2013].

Josefsson SJD AB S: Text Encodings of Some Security Related Structures; draft-josefsson-pkix-textual-00.TXT, Internet Engineering Task Force, IETF; Standardworkingdraft, Internet Society (ISOC) 4, Rue Des Falaises CH-1205 Geneva, Switzerland, Jan. 27, 2012 (Jan. 27, 2012), pp. 1-10, XP015080382, [retrieved on Jan. 27, 2012].

* cited by examiner

METHOD AND APPARATUS FOR GENERATING AND USING IMPLICITLY ATTESTED CERTIFICATE SIGNING REQUESTS

CROSS-REFERENCE TO RELATED APPLICATIONS

This application claims benefit of U.S. Provisional Patent Application No. 62/603,395, entitled "METHOD AND APPARATUS FOR GENERATING AND USING IMPLICITLY ATTESTED CERTIFICATE SIGNING REQUESTS," by Xin Qiu, Yiqun Yin, Oscar Jiang, Jason Pasion, filed Nov. 28, 2023, which application is hereby incorporated by reference herein.

BACKGROUND

1. Field

The present disclosure relates to systems and methods for generating and responding to certificate signing requests.

2. Description of the Related Art

A Certificate Signing Request (CSR) is a crucial component in the process of obtaining a digital certificate from a Certificate Authority (CA). A CSR is essentially a formal request, typically generated in a standard format like PKCS #10 (see IETF RFC 2986: PKCS #10: Certification Request Syntax Specification, Version 1.7, November 2000, hereby incorporated by reference herein) or based on other industry standards, made by an entity (such as a server, device, or individual) to the CA, seeking the issuance of a digital certificate. The CSR contains key information, including the entity's public key, device identifier (e.g., serial number, Media Access Control (MAC) address), and other necessary details. Standard formats like PKCS #10 or IETF RFC-based formats are used because they ensure interoperability and compatibility across different systems and CAs. These standardized formats define a common structure and set of fields, making it easier for CAs to process requests and issue certificates that adhere to recognized and trusted standards. In cases where entities or devices do not possess prior trusted identities, the focus of the CSR process is often on verifying the possession of the private key associated with the public key in the CSR, rather than verifying a pre-established identity. Additionally, standardized CSRs enhance security by reducing the risk of errors or misinterpretations during the certificate issuance process, thus promoting a more reliable and secure digital infrastructure.

While standardized CSR formats offer important advantages in terms of interoperability and error reduction during the certificate issuance process, it is essential to recognize that these standard formats, often based on complex encoding like Abstract Syntax Notation One (ASN.1), may introduce additional code and data storage requirements. For resource constrained Internet of Things (IoT) devices, this increased footprint can pose challenges, potentially impacting device cost and efficiency. Therefore, when working with IoT or similarly resource-limited environments, it becomes crucial to carefully balance the benefits of standardization with the constraints and requirements of the specific devices and use cases.

SUMMARY

To address the requirements described above, this document discloses a system and method for generating an implicitly attested CSR. In one embodiment, the method comprises generating a message having a public key of a key pair of a device and an identifier of a device; generating a digest of the message; signing the digest according to a private key of the key pair of the device; and encoding the signed digest and the public key to produce the CSR; wherein the CSR implicitly attests to the identity of the device according to at least one of the message, the digest, and the encoding.

Another embodiment is evidenced by a method of processing an implicitly attestable certificate signing request. In one embodiment, the method comprises receiving the CSR, the CSR generated by: generating a message having a public key of a key pair of a device, and a device identifier; generating a digest of the message; signing the digest according to a private key of the key pair of the device; and encoding the public key and the signed digest to produce the CSR; decoding the CSR; and determining if the decoded CSR is attested; and providing a digital certificate only if the decoded CSR is attested.

Other embodiments are evidenced by an apparatus having a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized, and structural changes may be made without departing from the scope of the present disclosure.

Overview

It is desirable to minimize the overhead associated with standardized formats in CSRs, which can enhance device cost-effectiveness and operational efficiency. While non-standard CSR formats can effectively reduce code and storage footprint in IoT devices, it is worth noting that non-standard CSRs, when designed with specific characteristics, can also serve the crucial function of device attestation, for devices lacking prior trusted identities. These tailored CSRs play a dual role by optimizing resource usage while enabling the verification of device authenticity, making them a valuable consideration for resource constrained IoT environments.

Non-standard CSRs can be efficiently processed by a remote CA that implements device attestation operations while simultaneously authenticating by verifying the CSR's signature. In this parlance, attestation refers to using non-standard non-cryptographic methods such as bit permutation to implicitly show that the CSR could only have been generated by an authorized device, while authentication refers to using cryptographic methods (signature algorithms, and the use of public/private keys, for example) to prove the validity/authenticity of the CSR. This dual-purpose approach ensures the integrity of the public key, allowing for the issuance of standard device certificates tailored to a specific application and ecosystem. Consequently, even when employing a non-standard CSR format, the outcome of the process remains the generation and return of standard certificates to the original requestors. These standard certificates, aligned with matching key pairs, are important for enabling seamless interoperability across diverse implementations by multiple vendors for various applications and communication protocols. Furthermore, a remote CA implementing authorization functions can be configured to only process CSRs with legitimate identifiers. Vendors may provide either a whitelist of authorized device identifiers or a blacklist of unauthorized device identifiers to the CA. Either the whitelist or blacklist can be used to authorize CSRs and achieve device attestation, preventing the provisioning of certificates to unauthorized devices.

Standard Mechanism for Computing a CSR

Figure 1:
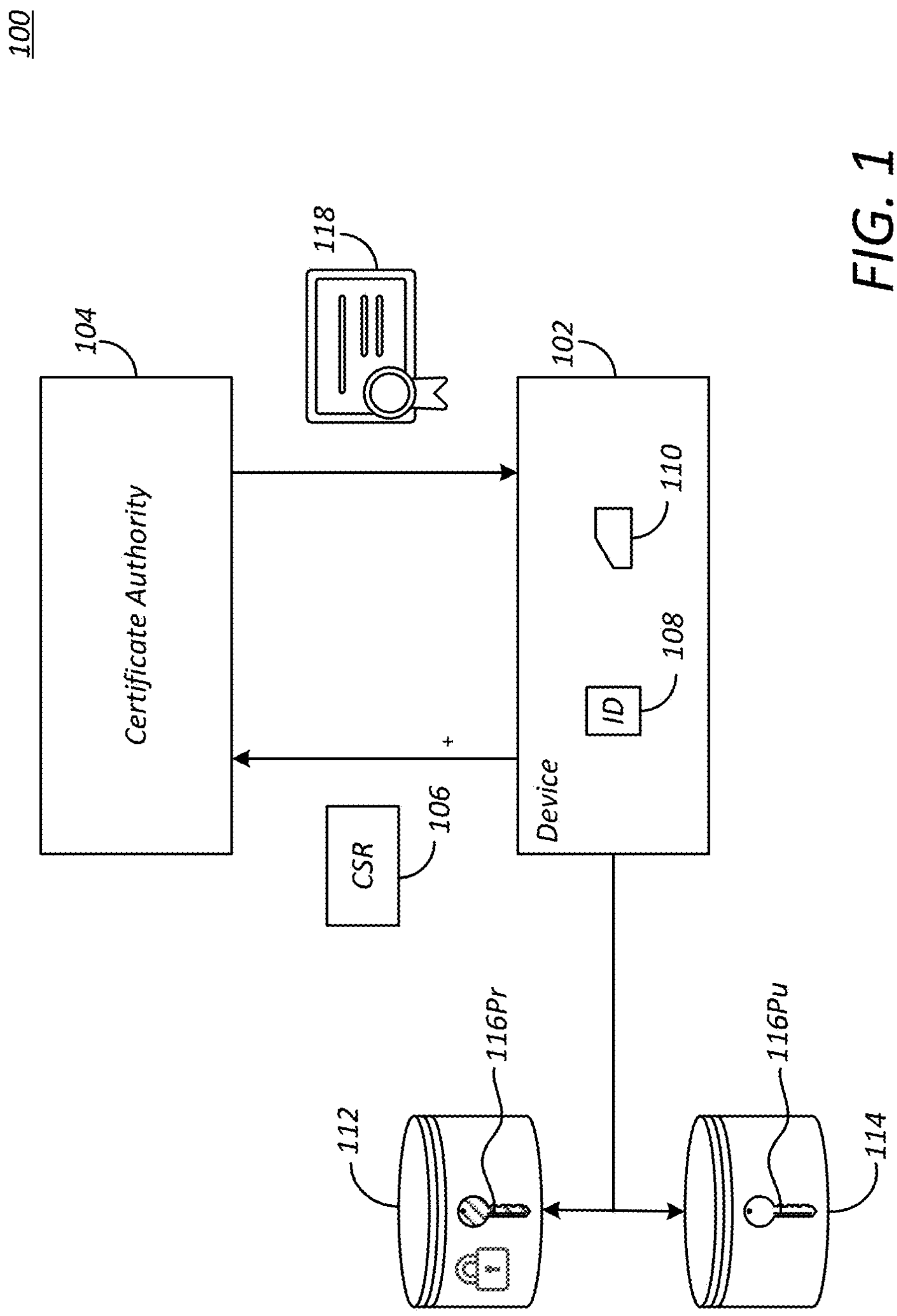
FIG. 1 is a diagram illustrating one embodiment of a device transmitting a CSR to a CA and obtaining a digital certificate.

FIG. 1 is a diagram illustrating one embodiment of a system 100 having a device 102 transmitting a CSR 106 to a CA 104 and obtaining a digital certificate 118. The device 102 computes or obtains a key pair 116 that comprises a private key 116Pr and a public key 116Pu. The private key 116Pr must be held private from other entities and is therefore typically stored in secure storage 112. The public key 116Pu is provided to other entities as a part of communication protocols, and can therefore be stored in non-secure storage 114.

When the device 102 desires to obtain a digital certificate 118, the device 102 generates the CSR 106. This may be accomplished as defined in many known protocols, including PKCS #10 (IETF RFC 2986), hereby incorporated by reference herein. Such protocols generally include the following processes for generating the CSR 106. First, a message is generated having the public key ($K_{Pu}$) 116Pu of the device 102, the device identifier 108, optional auxiliary information and optional attributes 110 (for example, a hash algorithm (Alg[h]) identifier or signature algorithm (Alg[s] identifier).

Next, a digest of the message is computed, for example, for example by use of a cryptographic hash function. Next, the device 102 signs the digest according to a selected signing algorithm using the private key 116Pr. The CSR 106 is then generated using the data comprising the message, the signature, and any auxiliary information. Typically, the CSR 106 is generated by computing an encoded version of the message, the signature, and the auxiliary information (such as an algorithm identifier). Different encoding schemes are available, including, for example, ANS.1 encoding.

One standard mechanism for computing a CSR 106 is defined in PKCS #10 (IETF RFC 2986, hereby incorporated by reference herein). ANS.1 is a standard interface description language defining data structures and encoding among those data structure. The encoding permits information to be shared and communicated between different platforms. ANS.1 encoding may employ Distinguished Encoding Rules (DER) are a restricted variant of Basic Encoding Rules (BER) and are often used for cryptographic applications such as obtaining and using signatures. DER places greater restrictions on the encoding than BER. DER and BER encoding are described in "Information technology—ASN.1 encoding rules: Specification of Basic Encoding Rules (BER), Canonical Encoding Rules (CER) and Distinguished Encoding Rules (DER), published by the Telecommunications Standardization Sector of the International Telecommunication Union in February 2021 (hereinafter incorporated by reference herein).

Implicitly Attestable CSR

Described below is a technique for generating a CSR 106 that is implicitly attestable. Essentially, an aspect of the CSR 106 is modified in a way that renders the CSR 106 to be non-standard, but recognizable and usable only by a CA 104 receiving the CSR 106 that is configured to properly interpret the non-standard CSR 106. That the CSR 106 can be received and properly interpreted by the CA 104 compels a reasonable conclusion that the device 102 sending the CSR 106 is a legitimate device 102 and provides information that the CA 104 can use to attest to the legitimacy of the requesting device 102.

Figure 2:
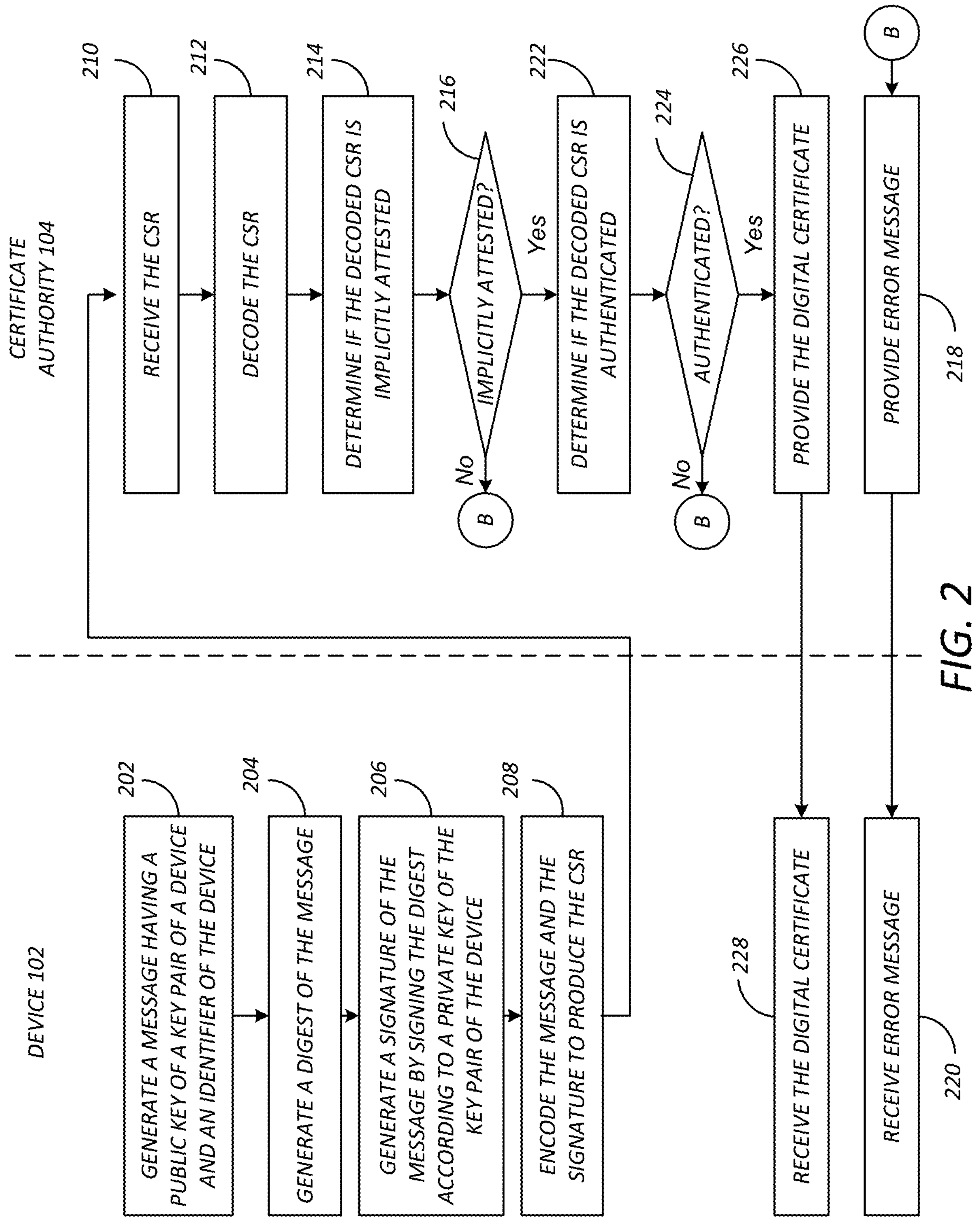
FIG. 2 is a diagram illustrating one embodiment of exemplary operations used to generate and respond to a CSR.

FIG. 2 is a diagram illustrating one embodiment of exemplary operations used to generate and respond to a CSR 106. In block 202, the device 102 generates a message having the public key ($K_{pu}$) 116Pu of the key pair of the device 102 as well as an identifier (ID) 108 of the device 102. The message may also include optional auxiliary information (Aux) and optional attributes (Att) as indicated follows.

$$\text{Message}=(K_{Pu},\text{ID},\text{Aux},\text{Att})$$

The device identifier 108 may comprise a media access control (MAC) address, an International Mobile Equipment Identity (IMEI), a Unique Device Identifier (UDID) or other factor.

In block 204, a digest of the message is generated. In one embodiment, the digest of the message comprises a cryptographic hash of the message.

$$\text{Digest}=\text{Hash}_{Alg[h]}(\text{message})$$

$$=\text{Hash}_{Alg[h]}(K_{Pu},\text{ID},\text{Aux},\text{Att})$$

where $\text{Hash}_{Alg[h]}(\bullet)$ denotes a cryptographic hash function implemented by the algorithm Alg[h].

A hashing algorithm is a mathematical function that converts data into a fixed-size string of characters, making the data unreadable. Cryptographic hash functions are one-way functions, so the data cannot be decoded or unscrambled by anyone else. This protects data at rest, even if someone gains access to a server, and can also help prove that data has not been altered after it was created.

Some common hashing algorithms include: MD5 and Secure Hash Algorithm (SHA). SHA is a family of widely used algorithms and is one of the most widely used hashing algorithms today. SHA-256 is a patented cryptographic hash function created by the National Security Agency in 2001 as a successor to SHA-1. SHA-256 takes an input of any length and creates a fixed-length hash value of 256 bits.

An identifier of the algorithm used to compute the hash is typically included in CSR 106, but that identifier may be omitted, and if a proprietary or confidential hash algorithm is used, that may be used to implicitly attest to the CSR 106.

In block 206, a signature of the message is generated by signing the digest according to the private key 116Pr of the key pair of the device 102.

$$\text{signature} = \text{Sign}_{Kpr,Alg[s]}(\text{digest})$$

$$= \text{Sign}_{Kpr,Alg[s]}(\text{Hash}_{Alg[h]}(\text{message}))$$

$$= \text{Sign}_{Kpr,Alg[s]}(\text{Hash}_{Alg[h]}(K_{Pu},\text{ID},\text{Aux},\text{Att}))$$

where Sign(●) refers to a signing function, Alg[s] refers to the signing algorithm used to perform the signing function, and Kpr refers to the private key of the key pair.

Finally, the signature and public key (and optional auxiliary information) are encoded.

$$\text{CSR} = \text{Enc}(\text{signature},\text{message})$$

$$= \text{Enc}(\text{Sign}_{Kpr,Alg[s]}(\text{Hash}_{Alg[h]}(K_{Pu},\text{ID},\text{Aux},\text{Att})),K_{Pu},\text{ID},\text{Aux},\text{Att})$$

where Enc(●) refers to an encoding operation.

To create an implicitly attestable CSR 106, at least one of the message, the digest, the hashing algorithm, or the encoding algorithm are changed such that the resulting CSR 106 is non-standard, and that non-standard CSR 106 itself, by its form or content, allows the CA 104 to conclude that the CSR 106 was transmitted by an authorized device 102. This can be accomplished, for example, by one or more of modifying the message, modifying the digest, or modifying the encoding of the message and signed digest. Such modification can be obtained by pre-processing or post-processing the message, the digest, and/or the signed digest, or modifying the encoding scheme used to generate the CSR 106. Such pre-processing or post-processing may be accomplished by applying a transform to the message or digest that is reversible only by the intended recipient of the CSR 106 (e.g., the CA 104) to recover the message or digest. The intended recipient (e.g., the CA 104) is capable of reversing the transform because that entity has knowledge of the transform applied and how to reverse that transform to recover the pre-transformed information. Exemplary transforms include permutation, bit-swapping, or bit shifting, as further discussed below.

Message Modification

In one embodiment the implicitly attestable CSR 106 is created by modifying the message. In one embodiment, the message is post processed after the message is generated and before the digest is generated. For example, the message may be modified by permutation, by bit-swapping, or by bit shifting. Permutation is accomplished by re-arranging the order of the bits. Bit swapping is accomplished by changing the value of bit position p1 with the value another bit position p2. One example of a swapping algorithm applied to two binary numbers may specify the significant bit position of the two bits to be swapped. For example, consider a bit swapping function:

$$\text{bswap}(\text{input},p1,p2)$$

wherein "input" represents the input, and "p1" and "p2" represent the significant bits to be swapped. The value of bswap(28, 0, 3) would be 21, since 28 in binary is 11100, and swapping the 0th and 3rd digits results in 10101, which is 21 in decimal.

Bit shifting may be accomplished by taking the value of a bit (e.g., the least significant bit) and shifting it to a position of a greater significant bit, with the interim bits shifted to the next lower significant bit position. For example, consider a bit shifting function:

$$\text{bshift}(\text{input},p1,p2)$$

wherein "input" represents the input, and "p1" represent the significant bit to be shifted and "p2" represents the number of significant bit positions and direction the bit is to be shifted. The value of bshift(28,3,−1) would be since 28 in binary is 11100, and swapping the third bit to the right by one bit position results in 11010, which is 26 in decimal.

Digest Modification

In another embodiment the implicitly attestable CSR 106 is created by modifying the digest. In one embodiment, the digest is post-processed after the digest is generated. Such post-processing can include generating a permutation of the digest, a bit swapped version of the digest, a bit-shifted version of the digest, or augmenting the digest with additional information, for example, an identifier 108 of the device 102. In cases where the generating the digest of the message comprises generating a cryptographic hash of the message, the post-processing may comprise hashing the digest one or more additional times.

Other means of modifying the digest includes generating the digest with a non-standard cryptographic hash algorithm known to the CA, but kept private from other entities.

Encoding Modification

As described in block 208, the signed digest and the public key may be encoded to produce the CSR 106. Encoding of the CSR 106 is typically used just for the presentation layer, and renders the CSR 106 easier to work with and to transmit. Typically, CSRs 106 are encoded according to the Public Key Cryptography Standards (PKCS). Standard encodings include: PKCS #10 and PKCS #7, which contains an embedded PKCS #10 request and additional information. The X.509 standard uses ASN.1 DER (Abstract Syntax Notation One Distinguished Encoding Rules) encoding. ASN is a standard interface description language for defining data structures that can be serialized and deserialized in a cross platform way.

In one embodiment, the implicitly attestable CSR 106 is generated at least in part by modifying the encoding used to encode the signed digest and the message. For example, the signed digest and message may be encoded using a non-standard and proprietary encoding decodable only by an authorized entity such as the CA 104. Such encoding can be proprietary to the device 102 and the CA 104.

The generation of a non-standard CSR 106 does not involve any modification to the innerworkings of the cryptographic primitives (hash function and signing algorithm). Therefore, the resulting functions and algorithms maintain the same security level as the original standard functions and algorithms. Further the non-standard CSR 106 may be generated using any or any combination of the foregoing techniques.

The post-processing the digest of hash values may involve the utilization of fixed bitwise operations and these operations may be strategically chosen to obfuscate the bitwise transformations, so that the resulting signatures remain opaque and resistant to verification through standard algorithms. Such deliberate opaqueness is a key element in achieving device attestation, by making it challenging for unauthorized entities to decipher or manipulate the attestation process.

The implementation of the above can vary significantly, often tailoring themselves to the unique characteristics of the device 102, the specific application at hand, the preferences of the vendor, and the requirements of the ecosystem. This level of customization permits precise and comprehensive attestation across multiple dimensions and classes, encompassing a wide range of attestation types and magnitudes.

Returning to FIG. 2, the CA 104 receives the CSR 106, and decodes the CSR 106, as shown in block 212.

The CA 104 then determines if the decoded CSR 106 is implicitly attested, as shown in block 214. The decoded CSR 106 can be determined to be implicitly attested by reversing the encodings and transformations that were applied in generating the CSR 106. The CSR 106 is then authenticated by computing a digest of the message contained in the CSR 106 (using the agreed upon algorithm), and comparing that with a version of the signature (signed digest) that is processed with the public key $K_{pu}$ 116Pu. If the computed digest and the decrypted signature compare favorably, the CSR 106 is authenticated.

For example, if the CSR 106 was encoded according to a non-standard encoding, determining if the decoded CSR 106 is attested is accomplished by determining if the CSR is decodable according to the non-standard decoding, and identifying the CSR 106 as attested only if the CSR 106 is decodable according to the non-standard decoding. Identifying the CSR 106 as decodable involves decoding the CSR 106 using the (non-standard) decoding expected from the device 102, and determining if the form and content of the CSR 106 after the decoding is as expected. If the CSR 106 received had standard encoding, and the CA 104 applies non-standard decoding, the result will be different in form or content than expected, and may in fact be uninterpretable as a CSR 106. If this is the case, the CA 104 can reasonably conclude that the SCR 106 was received from a device 102 that was not privy to the non-standard encoding the CA 104 expects from attested devices 102.

As another example, if the at least one of the message and the digest that were used to generate the CSR 106 was processed according to a transform, the step of determining if the decoded CSR 106 is attested (block 214) is performed by applying a reverse transform to associated at least one message or digest and implicitly attesting to the identity of the device 102 according to the reversed transform. For example, if a bit shifting transform were applied to the generated signature before encoding into the CSR 106, the CA 104 would apply what it believes to be the appropriate inverse bit shifting transform (determined from the device 102 from which the CSR 106 was received) to the decoded CSR 106. If the result is of the form and content expected, the CA 104 can conclude that the CSR 106 was received by an entity that applied the expected transform, and from that result can conclude that the CSR 106 was received from the expected device 102.

By modifying the CSR 106 by applying the above techniques, the CSR 106 implicitly attests to the identity of the device 102. This is because the modified CSR 106 has inherent characteristics created by the above modifications that render the CSR 106 only interpretable by an entity capable of properly decoding and applying reverse transforms that CSR 106.

If the decoded CSR 106 is implicitly attested and the CSR 106 is authenticated, processing is routed to block 218 via block 216, and an error message may be provided to the device 102. The device 102 receives the error message 220 in block 220. The decoded and implicitly attested CSR 106 is then examined to determine if the CSR 106 is authenticated. If the implicitly attested CSR 106 is authenticated, the digital certificate is provided by the CA 104 and received by the device 102 as shown in blocks 224, 226, and 228.

Authentication of the implicitly attested CSR 106 can be accomplished by the CA 104 generating a digest of the message retrieved from the CSR 106, decrypting the signature included in the CSR 106 according to the public key (also included in the CSR 106), and comparing the decrypted signature to the generated digest of the message. If the decrypted signature matches the generated digest, the CSR is deemed authenticated, and the message is determined to be untampered with.

Attestation by Whitelists and Blacklists

Determining if the decoded CSR 106 is implicitly attested can also be performed by use of blacklists and whitelists. A whitelist of device identifiers 108 (device identifiers 108 that indicate the provision of digital certificates to the associated device 102 is approved) can be made accessible to the CA 104. Recalling that the message includes an identifier 108 of the device, the CA 104 may simply decode and otherwise process the CSR 106 to recover the message having the device identifier 108, and compare that identifier 108 to the whitelist of approved devices 102. If the received device identifier 108 is included on the whitelist, the CSR 106 can be considered attested to, and the digital certificate 118 provided by the CA 104.

Similarly, determining if the decoded CSR 106 is attested can be performed by the use of blacklists. In this case, a blacklist of device identifiers 108 (device identifiers 108 that indicate the providing of digital certificates to the associated device 102 is not approved) can be made accessible to the CA 104. The CA 104 may decode and otherwise process the CSR 106 to recover the message having the device identifier 108, and compare that identifier 108 to the blacklist of banned devices. If the received device identifier 108 is included on the blacklist, the CSR 106 can be considered to fail attestation, and the device 102 is denied a digital certificate 118 (e.g., by transmitting a message indicating back to the device 102 that a digital certificate 118 will not be provided because of an attestation error).

Hardware Environment

Figure 3:
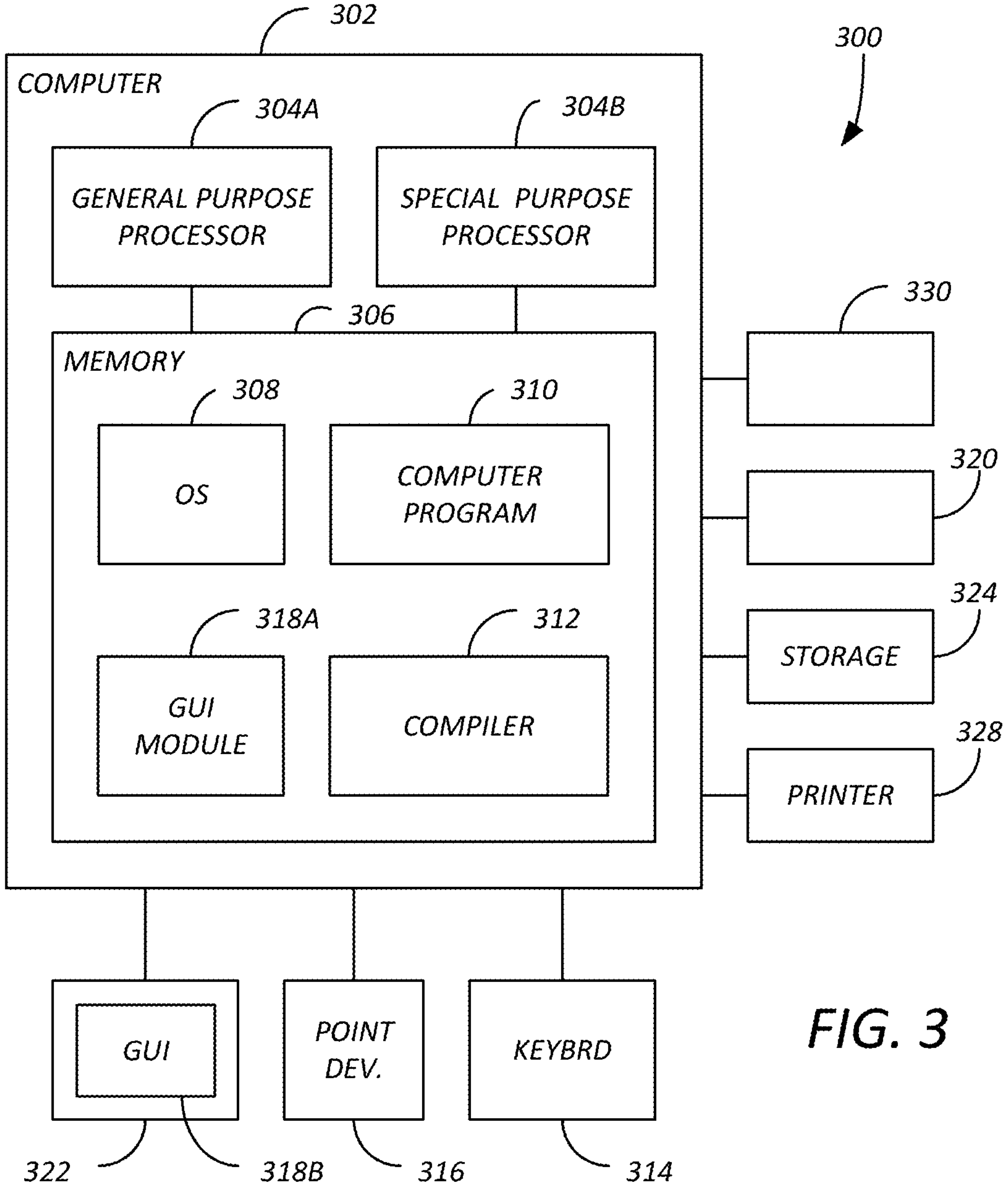
FIG. 3 illustrates an exemplary computer system 300 that could be used to implement processing elements of the above disclosure, including the device and CA.

FIG. 3 illustrates an exemplary computer system 300 that could be used to implement processing elements of the above disclosure, including the device 102 and CA 104. The computer 302 comprises a processor 304 and a memory, such as random access memory (RAM) 306. The computer 302 is operatively coupled to a display 322, which presents images such as windows to the user on a graphical user interface 318B. The computer 302 may be coupled to other devices, such as a keyboard 314, a mouse device 316, a printer 328, etc. Of course, those skilled in the art will recognize that any combination of the above components, or any number of different components, peripherals, and other devices, may be used with the computer 302.

Generally, the computer 302 operates under control of an operating system 308 stored in the memory 306, and interfaces with the user to accept inputs and commands and to present results through a graphical user interface (GUI) module 318A. Although the GUI module 318B is depicted as a separate module, the instructions performing the GUI functions can be resident or distributed in the operating system 308, the computer program 310, or implemented with special purpose memory and processors. The computer 302 also implements a compiler 312 which allows an application program 310 written in a programming language such as COBOL, C++, FORTRAN, or other language to be translated into processor 304 readable code. After completion, the application 310 accesses and manipulates data stored in the memory 306 of the computer 302 using the relationships and logic that was generated using the compiler 312. The computer 302 also optionally comprises an external communication device such as a modem, satellite link, Ethernet card, or other device for communicating with other computers.

In one embodiment, instructions implementing the operating system 308, the computer program 310, and the compiler 312 are tangibly embodied in a computer-readable medium, e.g., data storage device 320, which could include one or more fixed or removable data storage devices, such as a zip drive, floppy disc drive 324, hard drive, CD-ROM drive, tape drive, etc. Further, the operating system 308 and the computer program 310 are comprised of instructions which, when read and executed by the computer 302, cause the computer 302 to perform the operations herein described. Computer program 310 and/or operating instructions may also be tangibly embodied in memory 306 and/or data communications devices 330, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

A method of generating an implicitly attested certificate signing request is disclosed. In one embodiment, the method comprises: generating a message having a public key of a key pair of a device and an identifier of a device; generating a digest of the message; generating a signature of the message by signing the digest according to a private key of the key pair of the device; and encoding the message and the signature to produce the CSR; wherein the CSR implicitly attests to the identity of the device according to at least one of the message, the digest, and the encoding.

Implementations may include one or more of the following features.

Any of the above methods, wherein: at least one of the message and the digest are processed according to a transform before the encoding, the transform reversible only by a recipient of the CSR to recover the at least one of the message and the digest and to implicitly attest to an identity of the device.

Any of the above methods, wherein: the processing comprises one or more of: permutation; bit-swapping; and bit-shifting.

Any of the above methods, wherein: the digest is processed, and the processing comprises one or more of: permutation of the digest; bit-swapping of the digest; bit-shifting of the digest; and augmenting the digest with an identifier of the device.

Any of the above methods, wherein: the digest is generated by a hash algorithm; and the processing comprises hashing the digest one or more additional times.

Any of the above methods, wherein: the digest is generated by a non-standard hash algorithm.

Any of the above methods, wherein: the public key and the signed digest are encoded according to a non-standard encoding, decodable only by a recipient of the encoded CSR to recover the message and the digest and to implicitly attest an identity of the device.

Any of the above methods, wherein: the non-standard encoding comprises an encoding proprietary to the device and recipient of the CSR.

Any of the above methods, wherein: the method further comprises: providing the CSR to a Certificate Authority; attesting the CSR according to the at least one of the message, the digest, and the encoding; authenticating the CSR by: generating a digest of the message; verifying the signature according to the digest and the public key to produce a verification result; and authenticating the CSR according to the verification result.

Another embodiment is evidenced by an apparatus for generating an implicitly attested certificate signing request. In one embodiment, the apparatus comprises: a processor and a memory, communicatively coupled to the processor, the memory storing processor instructions. The processor instructions comprise instructions for: generating a message having a public key of a key pair of a device; generating a digest of the message; generating a signature of the message by signing the digest according to a private key of the key pair of the device; and encoding the message and the signature to produce the CSR; and wherein the CSR implicitly attests to the identity of the device according to at least one of the message, the digest, and the encoding.

Implementations may include one or more of the following features.

Any of the above apparatuses, wherein: at least one of the message and the digest are processed according to a transform before the encoding, the transform reversible only by a recipient of the encoded CSR to recover the at least one of the message and the digest and to implicitly attest to an identity of the device.

Any of the above apparatuses, wherein: the processing comprises one or more of: permutation; bit-swapping; and bit-shifting.

Any of the above apparatuses, wherein: the digest is processed, and the processing comprises one or more of: permutation of the digest; bit-swapping of the digest; bit-shifting of the digest; and augmenting the digest with an identifier of the device.

Any of the above apparatuses, wherein: the digest is generated by a hash algorithm; and the processing comprises hashing the digest one or more additional times.

Any of the above apparatuses, wherein: the digest is generated by a non-standard hash algorithm.

Any of the above apparatuses, wherein: the public key and the signed digest are encoded according to a non-standard encoding, decodable only by a recipient of the encoded CSR to recover the message and the digest and to implicitly attest an identity of the device.

Any of the above apparatuses, wherein: the non-standard encoding comprises an encoding proprietary to the device and recipient of the CSR.

Still another embodiment is evidenced by a method of providing a digital certificate in response to an implicitly attested certificate signing request. In one embodiment, the method comprises: receiving the CSR, the CSR generated by: generating a message having a public key of a key pair of a device, and a device identifier; generating a digest of the message; generating a signature by signing the digest according to a private key of the key pair of the device; and encoding the message and the signature to produce the CSR; decoding the CSR; implicitly attesting the CSR according to the at least one of the message, the digest, and the encoding; authenticating the CSR by: generating a digest of the message; verifying the signature according to the digest and the public key to produce a verification result; and authenticating the CSR according to the verification result; and providing the digital certificate only if the decoded CSR is implicitly attested and authenticated.

Implementations may include one or more of the following features.

Any of the above methods, wherein: at least one of the message and the digest are processed according to a transform before the encoding, the transform reversible only by a recipient of the CSR to recover the at least one of the message and the digest and to implicitly attest to an identity of the device.

Any of the above methods, wherein: the message and the encoded according to a non-standard encoding decodable only by the recipient of the CSR; and determining if the decoded CSR is attested comprises: determining if the CSR is decodable according to the non-standard encoding; and identifying the CSR as attested only if the CSR is decodable according to the non-standard decoding.

Any of the above methods, wherein: at least one of the message and the digest are processed according to a transform before the encoding, the transform reversible only by the recipient of the CSR to recover the at least one of the message and the digest; and determining if the decoded CSR is attested comprises: reversing the transform of the at least one of the message and the digest; and implicitly attesting to the identity of the device according to the reversed transform.

Any of the above methods, wherein: determining if the decoded CSR is attested comprises: determining if the device identifier is on a whitelist of legitimate device identifiers or on a blacklist of illegitimate device identifiers; if the device identifier is on the whitelist of legitimate device identifiers, attesting to the identity of the device and providing the digital certificate; and if the device identifier is on the blacklist of illegitimate device identifiers, returning an error.

What is claimed is:

1. A method of generating by a device an implicitly attested certificate signing request (CSR) to be sent to a recipient, comprising:
- generating a message having a public key of a key pair of said device and an identifier of said device, wherein said device identifier is different than said public key;
- generating a digest of the message;
- generating a signature of the message by signing the digest according to a private key of the key pair of the device; and
- encoding the message and the signature to produce the CSR;
- wherein the CSR implicitly attests to the identity of the device according to at least one of the message, the digest, the signature, and the encoding as a result of processing according to at least one of:
  - (i) at least one of said message, said digest and said signature has been modified before or after generating said at least one of said message, said digest and said signature by processing using an algorithm that the recipient is capable of reversing; and
  - (ii) said digest is generated using a hash algorithm that is only known to the device and the recipient; and
  - (iii) the encoding is performed using an encoding algorithm only decodable by the recipient.

2. The method of claim 1, wherein:
- said processing comprises at least one of the message and the digest are processed according to a transform before the encoding, the transform reversible only by the recipient of the CSR to recover the at least one of the message and the digest and to implicitly attest to the identity of the device.

3. The method of claim 2, wherein the processing comprises one or more of:
- permutation;
- bit-swapping; and
- bit-shifting.

4. The method of claim 2, wherein the digest is processed, and the processing comprises one or more of:
- permutation of the digest;
- bit-swapping of the digest;
- bit-shifting of the digest; and
- augmenting the digest with an identifier of the device.

5. The method of claim 2, wherein:
- the digest is generated by a hash algorithm; and
- the processing comprises hashing the digest one or more additional times.

6. The method of claim 1, wherein the digest is generated by said hash algorithm known only to the device and the recipient.

7. The method of claim 1, wherein the public key and the signed digest are encoded according to an encoding algorithm decodable only by the recipient of the encoded CSR to recover the message and the digest and to implicitly attest to the identity of the device.

8. The method of claim 7, wherein the encoding algorithm comprises an encoding algorithm known only to the device and recipient of the CSR.

9. The method of claim 1, wherein:
- the method further comprises:
  - providing the CSR to a Certificate Authority;
  - attesting the CSR according to the at least one of the message, the digest, and the encoding;
  - authenticating the CSR by:
    - generating a digest of the message;
    - verifying the signature according to the digest and the public key to produce a verification result; and
    - authenticating the CSR according to the verification result.

10. An apparatus for generating an implicitly attested certificate signing request (CSR) to be sent to a recipient, comprising:
- a processor;
- a memory, communicatively coupled to the processor, the memory storing processor instructions comprising processor instructions for:

generating a message having a public key of a key pair of a device and an identifier of the device, wherein said device identifier is different than said public key;

generating a digest of the message;

generating a signature of the message by signing the digest according to a private key of the key pair of the device; and encoding the message and the signature to produce the CSR; and wherein the CSR implicitly attests to the identity of the device according to at least one of the message, the digest, the signature and the encoding as a result of processing according to at least one of:

(i) at least one of said message, said digest and said signature has been modified before or after generating said at least one of said message, said digest and said signature by processing using an algorithm that the recipient is capable of reversing; and (ii) said digest is generated using a hash algorithm that is only known to the device and the recipient; and (iii) the encoding is performed using an encoding algorithm only decodable by the recipient.

11. The apparatus of claim 10, wherein:

the processing comprises at least one of the message and the digest are processed according to a transform before the encoding, the transform reversible only by the recipient of the encoded CSR to recover the at least one of the message and the digest and to implicitly attest to an identity of the device.

12. The apparatus of claim 11, wherein the processing comprises one or more of:

permutation;

bit-swapping; and bit-shifting.

13. The apparatus of claim 11, wherein the digest is processed, and the processing comprises one or more of:

permutation of the digest;

bit-swapping of the digest;

bit-shifting of the digest; and augmenting the digest with an identifier of the device.

14. The apparatus of claim 11, wherein:

the digest is generated by a hash algorithm; and the processing comprises hashing the digest one or more additional times.

15. The apparatus of claim 11, wherein the digest is generated by a hash algorithm known only to the device and the recipient.

16. The apparatus of claim 10, wherein the public key and the signed digest are encoded according to an encoding algorithm decodable only by the recipient of the encoded CSR to recover the message and the digest and to implicitly attest to the identity of the device.

17. The apparatus of claim 16, wherein the encoding comprises an encoding algorithm known only to the device and recipient of the CSR.

18. A method of providing a digital certificate from a recipient in response to an implicitly attested certificate signing request (CSR) sent by a device, comprising:

receiving the CSR, the CSR generated by:

generating a message having a public key of a key pair of the device, and a device identifier, wherein said device identifier is different than said public key;

generating a digest of the message;

generating a signature by signing the digest according to a private key of the key pair of the device; and encoding the message and the signature to produce the CSR;

wherein the CSR implicitly attests to the identity of the device according to at least one of the message, the digest, the signature and the encoding as a result of processing according to at least one of as a result of processing according to at least one of:

(i) at least one of said message, said digest and said signature has been modified before or after generating said at least one of said message, said digest and said signature by processing using an algorithm that the recipient is capable of reversing; and (ii) said digest is generated using a hash algorithm that is only known to the device and the recipient; and (iii) the encoding is performed using an encoding algorithm only decodable by the recipient:

decoding the CSR;

implicitly attesting the CSR according to the at least one of the message, the digest, the signature and the encoding;

authenticating the CSR by:

generating a digest of the message;

verifying the signature according to the digest and the public key to produce a verification result; and authenticating the CSR according to the verification result; and providing the digital certificate only if the decoded CSR is implicitly attested and authenticated.

19. The method of claim 18, wherein:

the encoding comprises an encoding algorithm decodable only by the recipient of the CSR; and determining if the decoded CSR is attested comprises:

determining if the CSR is decodable; and identifying the CSR as attested only if the CSR is decodable.

20. The method of claim 18, wherein:

the processing comprises at least one of the message and the digest are processed according to a transform before the encoding, the transform reversible only by the recipient of the CSR to recover the at least one of the message and the digest; and determining if the decoded CSR is attested comprises:

reversing the transform of the at least one of the message and the digest; and implicitly attesting to the identity of the device according to the reversed transform.

21. A method of providing a digital certificate from a recipient in response to an implicitly attested certificate signing request (CSR) sent by a device, comprising:

receiving the CSR, the CSR generated by:

generating a message having a public key of a key pair of the device, and a device identifier, wherein said device identifier is different than said public key;

generating a digest of the message;

generating a signature by signing the digest according to a private key of the key pair of the device; and encoding the message and the signature to produce the CSR;

decoding the CSR;

implicitly attesting the CSR according to the at least one of the message, the digest, the signature and the encoding;

authenticating the CSR by:

generating a digest of the message;

verifying the signature according to the digest and the public key to produce a verification result; and authenticating the CSR according to the verification result; and providing the digital certificate only if the decoded CSR is implicitly attested and authenticated wherein determining if the decoded CSR is attested comprises:

determining if the device identifier is on a whitelist of legitimate device identifiers or on a blacklist of illegitimate device identifiers;

if the device identifier is on the whitelist of legitimate device identifiers, attesting to the identity of the device and providing the digital certificate; and if the device identifier is on the blacklist of illegitimate device identifiers, returning an error.

* * * * *